United States Patent
Kinsel

(12) 
(10) Patent No.: US 6,468,321 B2
(45) Date of Patent: Oct. 22, 2002

(54) BLADE AND SKIRT ASSEMBLY FOR DIRECTIONAL GAS CLEANING AND DRYING SYSTEM

(76) Inventor: John W. Kinsel, 1401 Wisteria, Longview, TX (US) 75604

(*) Notice: Subject to any disclaimer, the term of this patent is extended or adjusted under 35 U.S.C. 154(b) by 0 days.

(21) Appl. No.: 09/757,944

(22) Filed: Jan. 10, 2001

(65) Prior Publication Data

US 2002/0088347 A1 Jul. 11, 2002

(51) Int. Cl.[7] ............................................. B01D 45/12
(52) U.S. Cl. ........................................ 55/457; 55/458
(58) Field of Search .......................... 55/456, 457, 458

(56) References Cited

U.S. PATENT DOCUMENTS

| | | | |
|---|---|---|---|
| 612,207 A | * 10/1898 | Kincaid et al. | 122/491 |
| 1,923,498 A | * 8/1933 | Nallinger | 181/231 |
| 3,703,800 A | * 11/1972 | Courbon | 261/116 |
| 4,076,508 A | * 2/1978 | Christensen | 55/309 |
| 5,735,937 A | 4/1998 | Dingfelder | 95/28 |
| 5,788,745 A | 8/1998 | Hahn | 95/231 |
| 6,059,859 A | 5/2000 | Alvarez, Jr. et al. | 95/117 |

* cited by examiner

Primary Examiner—Robert A. Hopkins
(74) Attorney, Agent, or Firm—R. Keith Harrison

(57) ABSTRACT

A blade and skirt assembly for a directional gas cleaning and drying system which is typically installed in a gas pipeline for removing solid and liquid impurities from steam or a process gas such as natural gas in the pipeline. The directional gas cleaning and drying system is typically characterized by a vertical, cylindrical gas vessel having an annular interior adsorption surface. In a preferred embodiment, the blade and skirt assembly of this invention includes multiple, angled vortex blades extending horizontally outwardly from a central cone-shaped blade hub, with the edges of the vortex blades attached to the adsorption surface. A cone-shaped dispersal skirt of the blade and skirt assembly is typically fitted with multiple, radially-extending gas flow vanes and typically attached to the blade hub. After the gas flows from the pipeline into the gas vessel, the stationary vortex blades direct the gas in a spiral path which the sloped dispersal skirt and gas flow vanes deflect outwardly toward the surrounding adsorption surface, where the solid and liquid impurities in the swirling gas are forced against the adsorption surface by centrifugal force and initially adhere to the surface by adsorption. The purified gas then re-enters the pipeline. The solid and liquid impurities, adsorbed on the dispersal skirt and adsorption surface, gravity-drain into a sump which is periodically emptied.

20 Claims, 3 Drawing Sheets

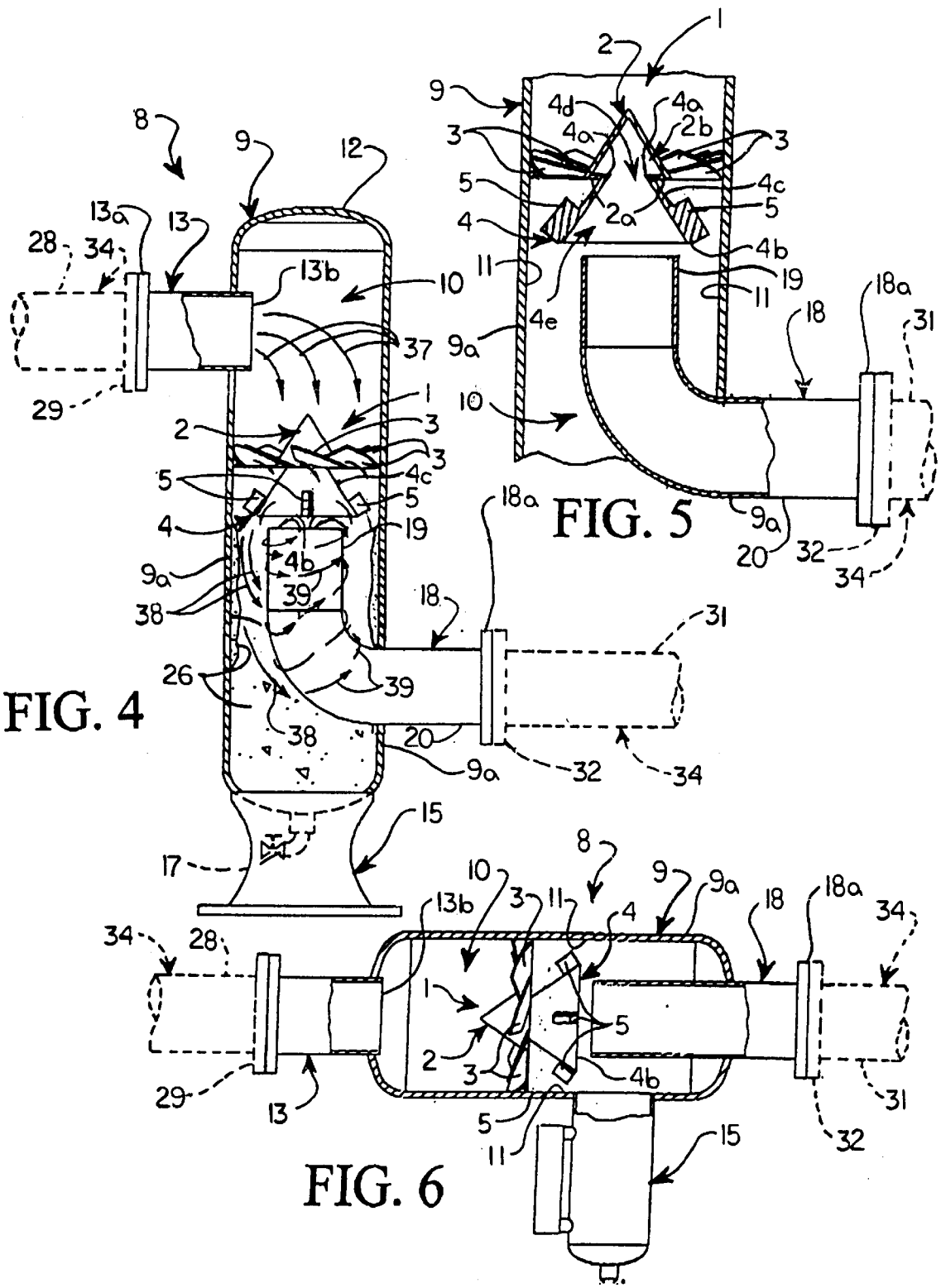

BLADE AND SKIRT ASSEMBLY FOR DIRECTIONAL GAS CLEANING AND DRYING SYSTEM

BACKGROUND OF THE INVENTION

Field of the Invention

This invention relates to systems for purifying and drying process gases and more particularly, to a blade and skirt assembly for a directional gas cleaning and drying system which is typically installed in a pipeline for removing solid and liquid impurities from a process gas, natural gas or steam in the pipeline. The directional gas cleaning and drying system is typically characterized by a vertical, cylindrical gas vessel having an annular interior adsorption surface. The blade and skirt assembly of this invention includes multiple, angled vortex blades extending horizontally outwardly from a central cone-shaped blade hub, with the edges of the vortex blades typically welded to the adsorption surface. A cone-shaped dispersal skirt of the blade and skirt assembly is typically welded to the blade hub, and the intake end of a gas outlet arm faces the flared bottom rim of the dispersal skirt in the gas vessel interior. In a preferred embodiment, multiple gas flow vanes are provided on the sloped dispersal surface of the dispersal skirt. After the gas flows typically by vacuum-induced service from. the pipeline into the gas vessel, the gas flows through the stationary vortex blades, which direct the gas in a descending spiral path. The circulating gas strikes the sloped dispersal surface and gas flow vanes of the dispersal skirt, which remove some of the solid and liquid impurities from the gas by adsorption and deflect the gas against the adsorption surface. The remaining solid and liquid impurities in the swirling gas are forced against the annular adsorption surface by centrifugal force and initially adhere to the surface by adsorption. The swirling, purified gas then travels in an inner spiral path around the intake portion of the gas outlet arm and ultimately enters the arm, through which the purified gas exits the gas vessel and typically re-enters the pipeline. The solid and liquid impurities, adsorbed on the dispersal skirt and adsorption surface, gravity-drain into a sump provided at the bottom of the gas vessel and which is periodically emptied.

When natural gas is produced from a gas well or recovered with hydrocarbons from an oil well, moisture and solid impurities such as sand particles, brine, crude oil and distillates are typically present in small quantities in the gas. The impurities, if unremoved from the gas, tend to lower the combustibility of the gas and thus render the gas less economical to burn for power generation or other industrial purposes. Some of the impurities in the gas emit toxins upon combustion, thus posing environmental risks if unremoved from the gas. Purification of natural gas thus both enhances the combustion characteristics of the gas for power production or other purposes and contributes to a cleaner environment. Additionally, the impurities should be removed from the natural gas stream before distribution to a remote source in a gas pipeline since the solid contaminants in the gas have a tendency to plug or corrode some of the distribution piping in the pipeline over time and thus, hinder gas flow through the piping.

A recent patent of interest which discloses an apparatus for removing contaminants from a gas stream is U.S. Pat. No. 5,735,937, entitled "Method for Removing Contaminants from a Gas Stream", dated Apr. 7, 1998, to Dingfelder. According to the Dingfelder separation method, a gas contaminant separator includes a pressure tube, and a concentric down pipe in the pressure tube and connected to a gas inlet conduit defines an annular space between the pressure tube and the down pipe. A helical rib extends from the surface of the down pipe and into the annular space, and multiple magnets are mounted on the down pipe between the helical rib and a perforated plate. The rotating motion of the gas imparted by the helical rib in the annular space causes the heavier contaminated particles to separate from the gas and collect along the surface of the down pipe. Further, the combined actions of the magnetic field, created by the magnets, and the perforated plate enhance coalescence and cross-linking of long-chain polar molecules in the gas such that the heavier, cross-linked contaminant molecules fall out of the gas stream.

Another patent of interest which involves purification of gas streams is U.S. Pat. No. 5,788,745, dated Aug. 4, 1998, to Hahn and entitled, "Process and Apparatus for Vapor Recovery". The Hahn process includes contacting a gas stream to be purified with an absorbent to remove water and hydrocarbon impurities from the gas stream. After their removal from the absorbent, the impurities are discarded.

U.S. Pat. No. 6,059,859, dated May 9, 2000, to Alvarez, Jr., et al, details a "Method, Composition and Apparatus for Water Removal from Non-Corrosive Gas Streams", in which a gas to be purified is passed through a dehydrating agent provided in a cynical container that is installed in a gas supply line for the gas. The dehydrating agent is a pelleted or granulated oxide or salt of an electropositive metal.

Still another gas purifying system known in the art for separating solid and liquid impurities from a process gas is the directional gas cleaning and drying system, characterized by a cylindrical vessel having an interior adsorption surface, with multiple, angled blades extending from a central hub and the edges of the blades typically welded to the annular adsorption surface. After the gas enters the vessel under positive or negative pressure from a pipeline, the gas flows through the blades, which cause the gas to flow in a descending spiral path toward the adsorption surface, and many of the solid and liquid impurities initially present in the gas are forced against the adsorption surface by centrifugal force and adsorbed onto the surface. The swirling, partially purified gas enters a gas exit pipe which conveys the gas from the vessel, while the solid and liquid impurities, adsorbed on the adsorption surface, gravity-flow down the adsorption surface into a sump which is periodically emptied. While the stationary blades are effective fi)r dispersing much of the solid and liquid impurities from the gas and onto the adsorption surface, the spiral path of the gas imparted by the blades is typically insufficiently narrow to facilitate contact of all of the swirling gas with the adsorption surface. Consequently, some of the solid and liquid impurities wherein in the gas upon exit from the vessel. Therefore, a new and improved mechanism is needed for enhancing separation of the solid and liquid impurities from the gas in the vessel.

Accordingly, an object of the. present invention is to provide a blade and skirt assembly for enhancing removal of impurities from a gas in a directional gas cleaning and drying system.

Another object of the invention is to provide a blade and skirt assembly for a directional gas cleaning and drying system which is typically installed in a gas pipeline for purifying and drying a process gas in the pipeline.

Still another object of this invention is to provide a blade and skirt assembly for removing solid and liquid impurities from a gas or steam, typically as the gas or steam flows through a pipeline.

Yet another object of the invention is to provide a new and improved blade and skirt assembly for a directional gas cleaning and drying system having a gas vessel and an interior adsorption surface provided in the gas vessel, which blade and skirt assembly is characterized by a central blade hub having multiple, angular vortex blades extending outwardly from the blade hub and a cone-shaped dispersal skirt disposed between the vortex blades and the intake end of a gas outlet arm which distributes the gas from the gas vessel typically to a gas outlet conduit of a gas pipeline, with multiple gas flow vanes provided on the sloped dispersal surface of the dispersal skirt, such that the angular vortex blades initially direct the flowing gas in a spiral path; the gas flow vanes and the sloped dispersal surface of the dispersal skirt deflect the swirling gas outwardly against the adsorption surface, wherein some of the solid and liquid impurities in the gas are adsorbed onto the gas flow vanes and dispersal surface of the dispersal skirt; the solid and liquid impurities in the partially-purified gas, swirling along the annular adsorption surface in a spiral path, are forced against the adsorption surface by centrifugal force and adsorbed onto the surface to further purify the gas; and the substantially purified and dried gas initially swirls in an inner spiral path around the intake portion of the gas outlet arm and then enters; the gas outlet arm, through which the gas exits the gas vessel and typically re-enters the pipeline.

A still further object of the invention is to provide a blade and skirt assembly for a directional gas cleaning and drying system, which blade and skirt assembly is characterized by multiple, angular vortex blades extending outwardly from a typically cone-shaped blade hub mounted in a gas vessel having an interior adsorption surface; and a cone-shaped dispersal skirt typically welded or otherwise attached to the blade hub, wherein gas enters. the gas vessel from a gas pipeline, the vortex blades direct the gas in a spiral path against the dispersal skirt and the dispersal skirt widens the spiral path of the swirling gas against the adsorption surface to facilitate adsorption of solid and liquid impurities by centrifugal force from the gas onto the adsorption surface.

Another object of the invention is to provide a new and improved directional gas cleaning drying system characterized by a gas vessel having an interior adsorption surface and adapted for receiving a process gas such as natural gas typically from a gas pipeline; and a blade and skirt assembly provided in the gas vessel, which blade and skirt assembly includes a blade hub; multiple, angular vortex blades extending outwardly from the blade hub; and a cone-shaped dispersal skirt disposed between the vortex blades and the intake end of a gas outlet arm with the sloped surface of the dispersal skirt fitted with multiple, spaced-apart gas flow vanes and facing the vortex blades, such that pressurized gas enters the gas vessel and flows through the blade and skirt assembly, the stationary vortex blades of which impart a spiral flow to the gas; the sloped dispersal surface of the dispersal skirt, in combination with the gas flow vanes, deflects the swirling gas outwardly in a widening spiral path against the annular adsorption surface and solid and liquid impurities in the gas are adsorbed onto the gas flow vanes and dispersal surface of the dispersal surface, as well as onto the adsorption surface by centrifugal force; and the purified gas then swirls in an inner spiral path around the gas outlet arm and finally, leaves the gas vessel through the gas outlet arm and re-enters the pipeline.

SUMMARY OF THE INVENTION

These and other objects of the invention are provided in a new and improved blade and skirt assembly for a directional gas cleaning and drying system which is typically installed in a gas pipeline for removing solid and liquid impurities from steam or a process gas such as natural gas in the pipeline. The blade and skirt assembly is mounted in a directional gas cleaning and drying system typically characterized by a vertical, cylindrical gas vessel having an annular interior adsorption is surface. The blade and skirt assembly includes multiple, angular vortex blades extending outwardly from a central cone-shaped blade hub provided in the gas vessels with the edges of the vortex blades typically welded to the annular adsorption surface. A cone-shaped dispersal skirt of the blade and skirt assembly is typically welded to the blade hub beneath the vortex blades, and multiple gas flow vanes are typically provided on the sloped dispersal surface of the dispersal skirt. The intake end of a gas outlet arm, typically connected to the pipeline, is disposed in facing relationship to the flared bottom rim of the dispersal skirt. After flowing into the gas vessel from the gas pipeline, the gas flows downwardly through the blade assembly, the stationary vortex blades of which direct the gas in an initially descending, spiral path. Some of the solid and liquid impurities in the deflected gas are adsorbed onto the gas flow vanes are sloped dispersal surface of the dispersal skirt. The dispersal skirt and gas flow vanes deflect the swirling, partially-purified gas outwardly in a widening spiral path against the annular adsorption surface, where the gas swirls along the annular adsorption surface in a slowly-descending spiral path and solid and liquid impurities in the gas initially adhere to the adsorption surface by centrifugal force and drain into a sump which is periodically emptied. The substantially purified and dried gas swirls upwardly in an inner spiral path around the intake portion of the gas outlet arm and enters the arm, through which the purified gas exits the gas vessel and typically re-enters the pipeline. In another embodiment of the blade and skirt assembly, the gas flow vanes are omitted from the sloped dispersal surface of the dispersal skirt.

BRIEF DESCRIPTION OF THE DRAWINGS

The invention will be better understood by reference to the accompanying drawings, wherein:

FIG. 4 is a sectional view, taken along section line 4—4 in FIG. 1, of the directional gas cleaning and drying system, more particular illustrating removal of solid and liquid impurities from a gas flowing through the system in operation of the blade and skirt assembly;

FIG. 5 is a sectional view of the gas vessel and gas outlet arm components of the directional gas cleaning and drying system illustrated in FIG. 1, with the blade and skirt assembly, also in section, mounted in the gas vessel;

FIG. 6 illustrates an alternative design, partially in section, of a directional gas cleaning and drying system, with the blade and skirt assembly of this invention mounted in the horizontal gas vessel component of the system;

DESCRIPTION OF THE PREFERRED EMBODIMENTS

Figures 1, 2, 3:
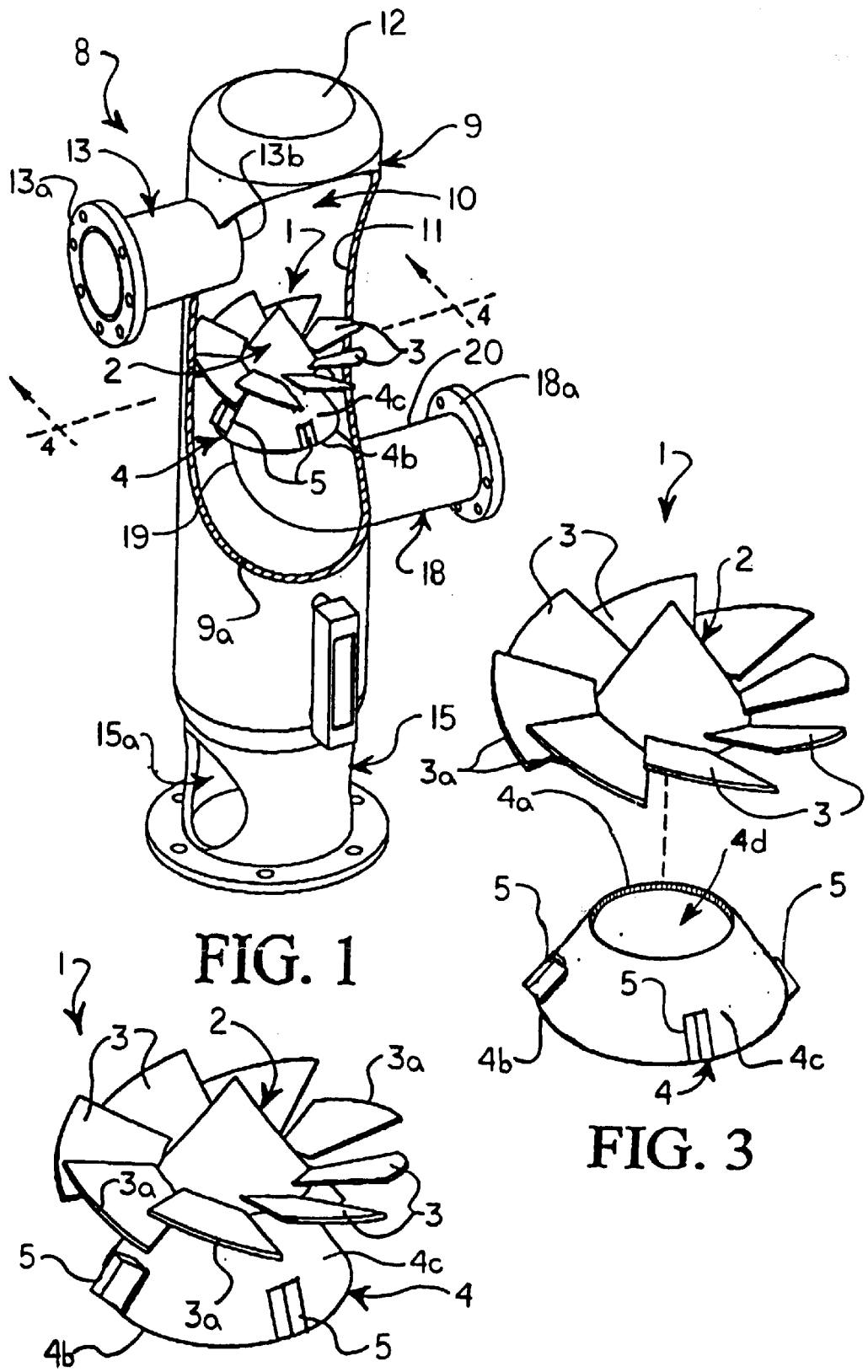
FIG. 1 is a perspective view, partially in section, of a typical directional gas cleaning and drying system, with the blade and skirt assembly of this invention shown mounted in the gas vessel component of the system.
FIG. 2 is a perspective view of the blade and skirt assembly of this invention.
FIG. 3 is an exploded, perspective view of the blade and skirt assembly illustrated in FIG. 2.

Referring Initially to FIGS. 1–5 of the drawings, in a preferred embodiment the blade and skit assembly of this invention is generally illustrated by reference numeral 1. The blade and skirt assembly 1 is designed to separate various solid and liquid impurities 26 (FIG. 4) from steam or a process gas such as natural gas in a directional gas cleaning and drying system 8 which is typically installed in a gas pipeline 34 (illustrated in phantom in FIG. 4), as hereinafter described. The blade and skirt assembly 1 is typically constructed of steel or other suitable metal or plastic components and includes a typically hollow, cone-shaped blade hub 2, having a hub interior 2b (FIG. 5) that is partially closed by an annular skirt attachment flange 2a, through which extends a central flange opening (not illustrated). Multiple vortex blades 3 extend outwardly from typically welded attachment to the blade hub 2, with the extending edge 3a of each vortex blade 3 disposed in angular relationship with respect to a horizontal plane, as illustrated in FIG. 2. The blade and skirt assembly 1 further includes a substantially cone-shaped dispersal skirt 4, having a flared skirt rim 4b. As illustrated in FIG. 5, then skirt apex 4a of the dispersal skirt 4 is typically welded or otherwise attached to the skirt attachment flange 2a of the blade hub 2. As further illustrated in FIG. 5, an air pressure opening 4d is typically provided in the skirt apex 4a, and establishes air communication between the skirt interior 4e and the hub interior 2b. In a preferred embodiment, multiple, rectangular, radially-extending gas flow vanes 5 are typically welded or otherwise attached to the dispersal surface 4c of the dispersal skirt 4, in spaced-apart relationship to each other for purposes which will be hereinafter described.

Referring next to FIGS. 1, 4 and 5 of the drawings, a typical directional gas cleaning and drying system 8 which utilizes the blade and skirt assembly 1 of this invention includes a vertical gas vessel 9, characterized by a cylindrical vessel wall 9a which defines a vessel interior 10, typically closed by a domed top 12. The vessel wall 9a has an annular interior adsorption surface 11 which encloses the vessel interior 10, as particularly illustrated in FIGS. 1 and 4. A gas intake arm 13 typically extends from the gas vessel 9 in fluid communication with the vessel interior 10 thereof, and is typically fitted with a circular conduit mount flange 13a adapted for attachment to a companion mount flange 29 of a gas intake conduit 28 of the gas pipeline 34 (illustrated in phantom in FIG. 4). The blade and skirt assembly 1 of this invention is mounted in the vessel interior 10, with the angled extending edge 3a (FIG. 2) of each vortex blade 3 typically welded or otherwise attached to the congruent annular interior adsorption surface 11 of the cylindrical vessel wall 9a Accordingly, the vortex blades 3 are typically disposed beneath the discharge end 13b of the gas intake arm 13 in the vessel interior 10, and the sloped dispersal surface 4c of the dispersal skirt 4 is disposed beneath the vortex blades 3. As particularly illustrated in FIG. 5, the open intake end of the vertical segment 19 of a curved gas outlet arm. 18 is disposed beneath the flared bottom rim 4b of the dispersal skirt 4. The gas outlet arm 18 bends from the vertical segment 19 at approximately 90 degrees to form a horizontal segment 20 of the gas outlet arm 18, which horizontal segment 20 extends from the vessel interior 10 through an arm opening (not illustrated) provided in the cylindrical vessel wall 9a of the gas vessel 9. The extending, exterior end of the horizontal segment 20 of the gas outlet arm 18 is typically fitted with a circular conduit mount flange 18a which is adapted for attachment to the companion mount flange 32 of a gas outlet conduit 31 of the gas pipeline 34. A sump 15 of selected design typically receives the bottom end of the gas vessel 9 for collecting gravity-drained solid and liquid impurities 26 (FIG. 4) which are initially adsorbed on the interior adsorption surface 11 of the vessel wall 9a after the blade and skirt assembly 1 removes the solid and liquid impurities 26 from gas flowing through the vessel interior 10, in operation of the directional gas cleaning and drying system 8 as hereinafter described. Typically, the sump 15 includes a sump valve 17 (instated in phantom) for selectively emptying the collected gravity-drained impurities 26 from the vessel interior 10, and a sump opening 15a (FIG. 1) for accessing the sump valve 17.

Referring again to FIG. 4 of the drawings, in operation of the directional gas cleaning and drying system 8, the gas flows under normal pipeline pressure from the gas intake conduit 28 of the pipeline 34, through the gas intake arm 13 and into the vessel interior 10 of the gas vessel 9, where the gas, drawn downwardly along the decreasing pressure gradient between the vessel interior 10 and the gas outlet conduit 31 of the pipeline 34, flows downwardly through the vortex blades 3 of the blade and skirt assembly 1, as illustrated by the arrows 37 in FIG. 4. Accordingly, the angular vortex blades 3 direct the flowing gas into a downward spiral path in which the swirling gas next strikes the sloped dispersal surface 4c and gas flow vanes 5 of the dispersal skirt 4, where the downward spiral path of the gas is abruptly deflected outwardly against the adjacent interior adsorption surface 11 of the vessel wall 9a, as indicated by the arrows 38. Simultaneously, some: of the solid and liquid impurities 26 are adsorbed from the deflected gas onto the gas flow vanes 5 and dispersal surface 4c of the dispersal skirt 4. As the gas initially strikes and then swirls along the annular adsorption surface 11, in a gradually-descending, clockwise or counterclockwise spiral path (depending on the angle position of the vortex blades 3) along the inner diameter of the cylindrical vessel wall 9a, centrifugal force acting on the solid and liquid impurities 26 in the circulating gas progressively forces most of the remaining impurities 26 from the gas, and the impurities 26 are adsorbed onto the adsorption surface 11. Finally, the still-circulating, substantially purified and dried gas is drawn upwardly toward the intake end of the gas outlet arm 18 by operation of the pressure gradient between the vessel interior 10 and the interior of the gas outlet arm 18. The purified and dried gas thus begins to swirl in an inner spiral path around the vertical segment 19 of the gas outlet arm 18 and eventually enters the open intake end of the gas outlet arm 18, as indicated by the arrows 39. Through the horizontal segment 20 of the gas outlet arm 18, the purified and dried gas is finally conducted to the gas outlet conduit 31 of the pipeline 34, which typically distributes the purified and dried gas to either an on-site storage facility or a remote destination, in conventional fashion. The solid and liquid impurities 26, adsorbed on the gas flow vanes 5 and dispersal surface 4c of the dispersal skirt 4 as well as the adsorption surface 11 of the vessel wall 9a, drain by gravity and collect in the bottom end portion of the gas vessel 9 and are periodically emptied from the gas vessel 9 by selective operation of the sump valve 17.

It will be appreciated by those skilled in the art that an important consequence of deflecting the swirling gas against the adsorption surface 11 of the gas vessel 9, imparted by the progressively widening diameter of the dispersal skirt 4 and the radial gas flow vanes 5, is that the descent velocity of the spiraling gas, initially imparted by the vortex blades 3, is substantially reduced by re-directing the kinetic energy of the flowing gas from a downward to an outward spiraling trajectory, against the adsorption surface 11. As a result, continuous circulation of the gas along the annular adsorption surface 11 is sustained for a longer period of time and a greater number of revolutions than is achieved using the vortex blades 3 alone, in a slowly-descending, rather than a quickly-descending, spiral path This expedient significantly increases the surface area of contact between the swirling gas and the adsorption surface 11 to facilitate adsorption of a correspondingly greater quantity of solid and liquid impurities from the gas and onto the adsorption surface 11. Additionally, substantially the entire volume of gas flowing through the vessel interior 10 establishes direct contact with some or all of the combined adsorptive surfaces provided by the dispersal surface 4c and gas flow vanes 5 of the dispersal skirt 4 and the adsorption surface 11 of the gas vessel 9, respectively, and these surfaces facilitate a large volume of adsorptive surface area for the solid and liquid impurities 26 in the flowing gas.

Figures 7, 8:
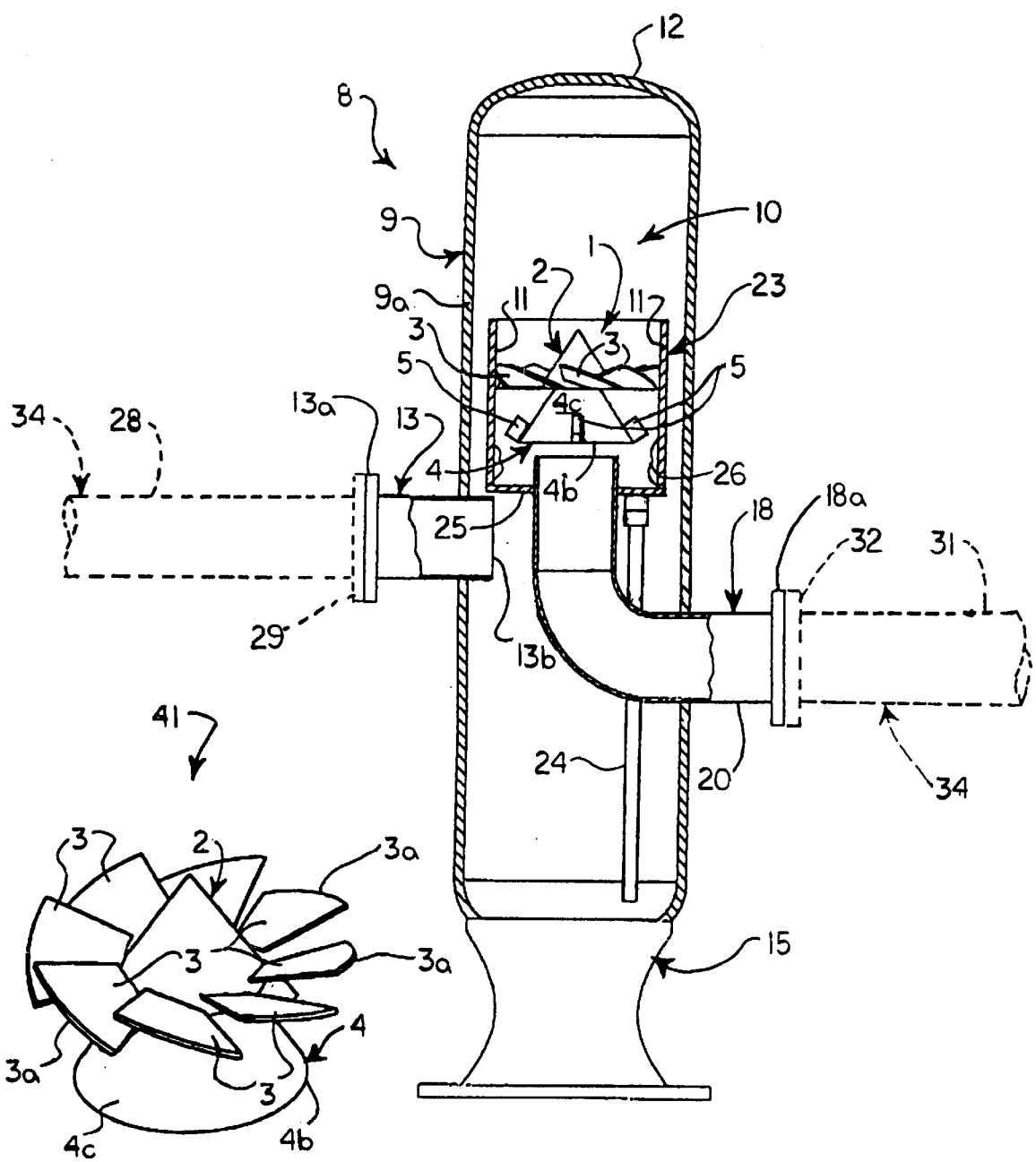
FIG. 7 illustrates another alternative design, also partially in section, of a directional gas cleaning and drying system, utilizing the blade and skirt assembly of this invention.
FIG. 8 is a perspective view of another embodiment of the blade and skirt assembly of this invention.

Referring next to FIGS. 6 and 7 of the drawings, it will be appreciated by those skilled in the art that the blade and skirt assembly 1 of this invention can be used with directional gas cleaning and drying systems 8 having a variety of configurations. As illustrated in FIG. 6, the gas vessel 9 of the directional gas cleaning and drying system 8 can have a horizontal rather than a vertical configuration as described above with respect to the directional gas cleaning and drying system 8 illustrated in FIGS. 1, 4 and 5. Accordingly, the blade and skirt assembly 1 is mounted in the vessel interior 10 of the gas vessel 9, in a sideways, rather than an upright, orientation, with the vortex blades 3 facing the discharge end 13b of the gas intake arm 13 and the intake end of the horizontal gas exit arm 18 disposed adjacent to the flared skirt rim 4b of the dispersal skirt 4. The sump 15 is mounted on the bottom portion of the horizontal gas vessel 9, as illustrated.

The directional gas cleaning and drying system 8 illustrated in FIG. 7 is characterized by a cylindrical adsorption cylinder 23 which is mounted in the vessel interior 10 of the gas vessel 9, and the bottom end of the adsorption cylinder 23 is typically closed by a circular cylinder bottom 25. The cylindrical adsorption cylinder 23 has an annular interior adsorption surface 11, to which the vortex blades 3 of the blade and skirt assembly 1 are typically welded. The discharge end 13*b* of the gas intake arm 13 can be disposed beneath the adsorption cylinder 23, as illustrated, or alternatively, above the blade and skirt assembly 1, as described above with respect to the directional gas cleaning and drying system 8 illustrated in FIGS. 1, 4 and 5. In either case, the skirt and blade assembly 1 is effective for removing solid and liquid impurities 26 (FIG. 4) from the gas as heretofore described with respect to the embodiment illustrated in FIG. 4. Solid and liquid impurities 26, adsorbed on the annular adsorption surface 11 of the adsorption cylinder 23, drains by gravity into the sump 15, through a vertical downcomer 24 which extends through the cylinder bottom 25 of the adsorption cylinder 23.

Referring next to FIG. 8 of the drawings, in another embodiment of the blade and skirt assembly generally illustrated by reference numeral 41, the radial gas flow vanes 5 (FIG. 2); are omitted from the dispersal surface 4*c* of the dispersal skirt 4. Accordingly, in typical application of the blade and skirt assembly 41 in the manner described above with respect to the blade and skirt assembly 1 illustrated with respect to FIG. 4, the angular vortex blades 3 direct the flowing gas into a downward spiral path in which the swirling gas initially strikes the sloped dispersal surface 4*c* of the dispersal skirt 4, where the downward spiral configuration of the gas is progressively expanded diametrically as the descending swirling gas progressively contacts the sloped dispersal surface 4*c* along the widening diameter of the dispersal skirt 4, until the inner diameter of the circulating gas substantially matches the diameter of the skirt rim 4*b*. The widening dispersal skirt 4 directs the swirling gas in a gradually-descending, clockwise or counterclockwise spiral path along the adjacent interior adsorption surface 11 of the vessel wall 9*a*. As the gas continues to swirl along the annular adsorption surface 11, centrifugal force acting on the solid and liquid impurities 26 in the circulating gas progressively forces the impurities 26 from the gas and against the adsorption surface 11. Finally, the still-circulating, substantially purified gas is drawn upwardly toward the intake end of the gas outlet arm 18 by operation of the pressure gradient between the vessel interior 10 and the interior of the gas outlet arm 18, and the purified gas swirls in an inner spiral path around the vertical segment 19 of the gas outlet arm 18 and eventually enters the open intake end of the gas outlet arm 18, as illustrated in FIG. 4. The purified and dried gas is conducted to the gas outlet conduit 31 of the pipeline 34, and the solid and liquid impurities 26, adsorbed on the adsorption surface 11 of the vessel wall 9*a*, as well as the dispersal surface 4*c* of the dispersal skirt 4, eventually drain by gravity into the sump 15, periodically emptied by operation of the sump valve 17. The widening dispersal skirt 4 attenuates the descent velocity of the downward spiral path of the swirling gas such that continuous circulation of the gas along the annular adsorption surface 11 is sustained for a sufficiently long period of time for adsorption of most of the solid and liquid impurities from the gas and onto the adsorption surface 11. It is understood that the blade and skirt assembly 41 is suitably adapted for use with the directional gas cleaning and drying system configurations illustrated in FIGS. 4, 6 and 7.

It will be appreciated by those skilled in the art that the blade and skirt assembly of this invention is capable of being used in directional gas cleaning and drying systems of various designs and configurations to remove a variety of solid and liquid impurities from substantially any type of process gas including natural gas, noble gases or steam, in non-exclusive particular. While the blade and skirt assembly is operable under normal pipeline pressures, it is understood that normal pipeline operating parameters depend on the particular process gas distributed through the pipeline, according to the knowledge of those skilled in the art.

While the preferred embodiments of the invention have been described above, it will be recognized and understood that various modifications can be made in the invention and the appended claims are intended to cover all such modifications which may fill within the spirit and scope of the invention.

Having described my invention with the particularity set forth above, what is claimed is:

1. A blade and skirt assembly for a directional gas cleaning and drying system which is designed for removing solid and liquid impurities from a gas and includes a gas vessel for receiving the gas and a surface provided in the gas vessel, said blade and skirt assembly comprising:

(a) a blade hub for mounting in the gas vessel, said blade hub having a first hub end and a second hub end wider than said first hub end;

(b) a plurality of vortex blades extending from said blade hub for directing the gas in a spiral path; and (c) a dispersal skirt having a first skit end narrower than said second hub end and disposed in adjacent relationship to said plurality of vortex blades and a second skirt end wider than said first skirt end for widening the spiral path of the gas against the surface, whereby the solid and liquid impurities adhere to said dispersal skirt and the surface and the gas is substantially purified and dried.

2. The blade and skirt assembly of claim 1 comprising a plurality of gas flow vanes provided on said dispersal skirt for further directing the gas against the surface.

3. The blade and skirt assembly of claim 1 wherein each of said plurality of vortex blades is adapted for attachment to the adsorption surface and comprising a plurality of gas flow vanes provided on said dispersal skirt for further directing the gas against the surface.

4. The blade and skirt assembly of claim 1 wherein said dispersal skirt is attached to said blade hub.

5. The blade and skirt assembly of claim 4 comprising a plurality of gas flow vanes provided on said dispersal skirt for further directing the gas against the surface.

6. A blade and ski assembly for a directional gas cleaning and drying system which is designed for removing solid and liquid impurities from a gas and includes a gas vessel for receiving the gas and a surface provided in the gas vessel, said blade and skirt assembly comprising:

(a) a blade hub for mounting in the gas vessel;

(b) a plurality of vortex blades extending from said blade hub for directing the gas in a spiral path;

(c) a dispersal skirt disposed in adjacent relationship to said plurality of vortex blades for widening the spiral path of the gas against the surface, whereby the solid and liquid impurities adhere to said dispersal skirt and the surface and the gas is substantially purified and dried; and (d) a plurality of gas flow vanes provided on said dispersal skirt for further directing the gas against the surface.

7. The blade and skirt assembly of claim 6 wherein said dispersal skirt is attached to said blade hub.

8. The blade and skirt assembly of claim 6 wherein each of said plurality of vortex blades is adapted for attachment to the surface.

9. A blade and skirt assembly for a directional gas cleaning and drying system which is designed for removing solid and liquid impurities from a gas in a pipeline and includes a gas vessel for receiving the gas from the pipeline; a surface provided in the gas vessel; and a gas outlet arm having a gas intake end for distributing the gas from the gas vessel into the pipeline, said blade and skirt assembly comprising:

(a) a substantially cone-shaped blade hub for mounting in the gas vessel said blade hub having a first hub end and a second hub end wider than said first hub end;

(b) a plurality of vortex blades extending from said blade hub for directing the gas in a first spiral path; and (c) a substantially cone-shaped dispersal skirt disposed between said plurality of vortex blades and the gas intake end of the gas outlet arm for widening the first spiral path of the gas against the surface, said dispersal skirt having a first skirt end narrower than said second hub end and a second skirt end wider than said first skirt end, whereby the solid and liquid impurities in the gas adhere to the surface and the gas is substantially purified and dried; and the purified and dried gas swirls in a second spiral path inside the first spiral path and around the gas outlet arm, and enters the gas intake end of the gas outlet arm and exits the gas vessel, respectively.

10. The blade and skirt assembly of claim 9 comprising a plurality of gas flow vanes provided on said dispersal skirt for further directing the gas against the surface.

11. A blade and skirt assembly for a directional gas cleaning and drying system which is designed for removing solid and liquid impurities from a gas in a pipeline and includes a gas vessel for receiving the gas from the pipeline; a surface provided in the gas vessel; and a gas outlet arm having a gas intake end for distributing the gas from the gas vessel into the pipeline, said blade and skirt assembly comprising:

(a) a substantially cone-shaped blade hub for mounting in the gas vessel;

(b) a plurality of vortex blades extending from said blade hub for directing the gas in a first spiral path;

(c) a dispersal skirt disposed between said plurality of vortex blades and the gas intake end of the gas outlet arm for widening the first spiral path of the gas against the surface, whereby the solid and liquid impurities in the gas adhere to the surface and the gas is substantially purified and dried; and the purified and dried gas swirls in a second spiral path inside the first spiral path and around the gas outlet arm, and enters the gas; intake end of the gas outlet arm and exits the gas vessel, respectively; and (d) a plurality of gas flow vanes provided on said dispersal skirt for further directing the gas against the surface.

12. The blade and skirt assembly of claim 11 wherein said dispersal skirt is attached to said blade hub.

13. A directional gas cleaning and drying system for removing solid and liquid impurities from a gas, said system comprising:

(a) a gas vessel for receiving the gas;

(b) an interior surface provided in said gas vessel;

(c) a blade and skirt assembly provided in said gas vessel adjacent to said surface, said blade and skit assembly comprising a blade hub having a first hub end and a second hub end wider than said first hub end, a plurality of vortex blades for directing the gas in a first spiral path and a dispersal skirt having a first skirt end narrower than said second hub second end disposed adjacent to said plurality of vortex blades for widening the first spiral path of the gas against said surface, whereby solid and liquid impurities from the gas adhere to said dispersal skirt and said surface and the gas is substantially purified and dried; and (d) a gas outlet arm having an ie end disposed adjacent to said dispersal skirt for receiving the purified and dried gas from said blade and skirt assembly, whereby the purified gas swirls around said gas outlet arm in a second spiral path inside the first spiral path, enters said intake end of said gas outlet arm and exits said gas vessel through said gas outlet arm, respectively.

14. The directional gas cleaning and drying system of claim 13 comprising a plurality of gas flow vanes provided on said dispersal skirt for further directing the gas against said surface.

15. A directional gas cleaning and drying system for removing solid and liquid impurities from a gas, said system comprising:

(a) a gas vessel for receiving the gas;

(b) an interior surface provided in said gas vessel;

(c) a blade and skirt assembly provided in said gas vessel adjacent to said surface, said blade and skirt assembly comprising a plurality of vortex blades for directing the gas in a first spiral path and a dispersal skirt disposed adjacent to said plurality of vortex blades for widening the first spiral path of the gas against said surface, whereby solid and liquid impurities from the gas adhere to said dispersal skirt and said surface and the gas is substantially purified and dried;

(d) a gas outlet arm having an intake end disposed adjacent to said dispersal skirt for receiving the purified and dried gas from said blade and skirt assembly, whereby the purified gas swirls around said gas outlet arm in a second spiral path inside the first spiral path, enters said intake end of said gas outlet arm and exits said gas vessel through said gas outlet arm, respectively; and (e) a plurality of gas flow vanes provided on said dispersal skirt for further directing the gas against said surface.

16. The directional gas cleaning and drying system of claim 15 wherein each of said plurality of vortex blades is attached to said surface.

17. A directional gas cleaning and drying system for removing solid and liquid impurities from a gas, said system comprising:

(a) a gas vessel for receiving the gas;

(b) an interior surface provided in said gas vessel;

(c) a blade and skirt assembly provided in said gas vessel adjacent to said surface, said blade and skirt assembly comprising a plurality of vortex blades for directing the gas in a first spiral path and a dispersal skirt disposed adjacent to said plurality of vortex blades for widening the first spiral path of the gas against said surface, whereby solid and liquid impurities from the gas adhere to said dispersal skirt and said surface and the gas is substantially purified and dried;

(d) a gas outlet arm having an intake end disposed adjacent to said dispersal skirt for receiving the purified and dried gas from said blade and skirt assembly, whereby the purified gas swirls around said gas outlet arm in a second spiral path inside the first spiral path, enters said intake end of said gas outlet arm and exits said gas vessel through said gas outlet arm, respectively; and (e) a cylinder provided in said gas vessel and wherein said interior surface and said blade and skirt assembly are disposed in said cylinder.

18. The directional gas cleaning and drying system of claim 17 comprising a plurality of gas flow vanes provided on said dispersal skirt for further directing the gas against said surface.

19. The directional gas cleaning and dying system of claim 17 wherein each of said plurality of vortex blades is attached to said surface.

20. The directional gas cleaning and drying system of claim 19 comprising a plurality of gas flow vanes provided on said dispersal skirt for further directing the gas against said surface.

* * * * *